| United States Patent [19] | [11] Patent Number: 4,758,610 |
| Tadashi et al. | [45] Date of Patent: Jul. 19, 1988 |

[54] PROCESS OF PRODUCING RESIN CONCRETE

[75] Inventors: Okamoto Tadashi, Fujisawa; Utsunomiya Toru, Misato; Tamura Tomio, Kashiwa; Matsubara Sumiyuki, Matsudo; Hasuo Koichi, Shinjuku, all of Japan

[73] Assignee: Mitsui Kensetsu Kabushiki Kaisha, Tokyo, Japan

[21] Appl. No.: 1,895

[22] Filed: Jan. 9, 1987

[30] Foreign Application Priority Data

Aug. 26, 1986 [JP] Japan .................................. 61-199602
Aug. 26, 1986 [JP] Japan .................................. 61-199603
Oct. 13, 1986 [JP] Japan .................................. 61-242841

[51] Int. Cl.$^4$ .......................... C08K 9/10; C08K 3/34
[52] U.S. Cl. .................................. 523/211; 523/210; 524/2; 524/3; 524/4; 524/5; 524/6; 524/7; 524/8; 524/906
[58] Field of Search ................ 523/210, 211, 307; 524/2, 3, 4, 5, 6, 7, 8, 906; 206/219; 405/259, 261

[56] References Cited

U.S. PATENT DOCUMENTS

| 3,944,515 | 3/1976 | Foley et al. | 524/650 |
| 3,956,227 | 5/1976 | Foley et al. | 524/6 |
| 4,096,944 | 6/1978 | Simpson | 206/219 |
| 4,362,675 | 12/1982 | Shannon | 264/237 |
| 4,474,905 | 10/1984 | Hadermann et al. | 523/307 |
| 4,487,529 | 12/1984 | Douty | 405/261 |
| 4,516,884 | 5/1985 | Douty | 206/219 |

FOREIGN PATENT DOCUMENTS 55-161197  12/1980  Japan .................................. 524/5

*Primary Examiner*—Lewis T. Jacobs
*Attorney, Agent, or Firm*—Wenderoth, Lind & Ponack

[57] ABSTRACT

A soldified and particulated resin and a substantially solidified-state-maintained water are mixed with cement and after the mixing is finished, the solidified resin and water are liquefied and the cement is hydrated with the liquefied water. Since the resin maintains the solidified and particulated state and the water also maintains the solidified state during mixing, the mixing work of cement, water and resin is uniformly performed.

17 Claims, 1 Drawing Sheet

PROCESS OF PRODUCING RESIN CONCRETE

BACKGROUND OF THE INVENTION

This invention relates to a process of producing a resin concrete which is easy to mix.

Heretofore, when a resin concrete is produced, a liquidized resin, cement, water and aggregate are mixed.

However, this conventional process has shortcomings in that the liquidized resin is attached to a mixer when mixing, which makes it awkward to handle. Thus, this conventional process is hardly put into actual use.

The present invention is accomplished to overcome the above-mentioned shortcomings. It is therefore an object of the present invention to provide a process of producing a resin concrete which is easy to mix and easy to handle at that time.

SUMMARY OF THE INVENTION

A first aspect of the present invention comprises the steps of mixing a solidified particulated resin, a substantially solidified-state-maintained water and cement, liquefying the resin and water in the mixture, and hydrating the cement with the liquified water.

A second aspect of the present invention comprises the steps of mixing a solidified particulated resin, a substantially solidified-state-maintained water and cement, and extruding the mixture.

A third aspect of the present invention comprises the steps of mixing a resin which was solidified and particulated under a solidifying point, a substantially solidified-state-maintained water and cement to obtain a particulated mixture of cement, resin and water, putting the particulated mixture into a form and heating the same, and melting the resin by the heating, thereby to allow the resin to flow into the mixture, liquefying the water, and hydrating the cement with the liquefied water.

A fourth aspect of the present invention comprises the steps of mixing a resin which was capsulated in a micro-capsule, a substantially solidified-state-maintained water and cement to obtain a particulated mixture of cement, resin and water, putting the particulated mixture into a form, and breaking the micro-capsule, thereby to allow the resin to flow into the mixture, liquefying the water, and hydrating the cement with the water.

According to the present invention, resin maintains a dried particle state since the resin is capsulated in a micro-capsule or solidified when mixing, and therefore the resin is not attached to a mixer, etc. In addition, when the resin is applied, it is very easy to handle. Moreover, since water is also applied in a solidified state, it can be uniformly mixed with cement. Thus, there can be obtained a concrete of high strength by lowering the water-cement ratio.

Such obtained resin concrete can be used as follows.

(1) Architecture: floor, wall, roof, outer wall, fence, corrugated plate, etc.
(2) Pipe: pressure pipe, drain pipe, water pipe, optical fiber pipe, storage pipe, etc.
(3) Electronic parts: insulating material, socket, switch gear, etc.
(4) Various instruments: sound panel, cabinet, etc.
(5) Special use: radiation shielding plate, nonmagnetic structural member, etc.

DESCRIPTION OF THE PREFERRED EMBODIMENT

Figure 1:
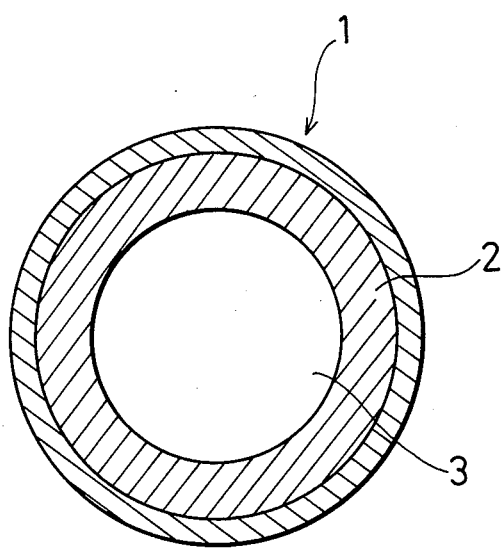
FIG. 1 is an illustration showing one example of capsulated resin and water in a micro-capsule.

The embodiment of the present invention will be described in detail.

In order to produce a resin concrete, firstly, cement, aggregate, water and resin are put into a mixer and mixed. At this time, the water and resin respectively are used in the solidified and particulated states obtained by solidifying them at low temperature. More specifically, water is used by being frozen at a temperature below the freezing point and crushed into particles, or otherwise used in the form of ice which is frozen in a particle shape. Similarly, resin is used by being solidified at a temperature below its solidifying point and powdered. There can also be used such resin which remains in the solid state at normal temperature. The resin used herein may be a two-component mixture composed of a polymer as the main component and a hardening agent, or a one-component heat hardening resin. If desired, it can be used by adding the hardening agent of the two-component mixture to water in a liquid state and freezing, and solidifying and particulating the mixture of water and hardening agent. That is, when the mixing is performed, since the water and resin maintain the solidified states, they act as dried particle elements. Thus, the mixing work can be smoothly performed without such trouble that the resin attaches to a mixer, and the resin and the water particles are uniformly mixed with cement. During the mixing, the atmosphere therearound should be kept at a temperature below the freezing and solidifying points of water and resin. Cement, aggregate, water, resin, etc. may be added in any order when mixing. Similarly, they may be added by any method. It is of course acceptable that, for example, cement and resin are mixed beforehand and such obtained mixture is mixed with water and aggregate.

In this way, when the mixing of cement, aggregate, water and resin in the particle states is finished, the mixture is subjected to treatment by an extruder and formed into a predetermined shape. The mixture is heated with compression heat produced when the mixture is extruded. The result is that, the water and resin are liquefied due to the heat and become molten, and the water hydrates the cement particles nearby and the cement starts being solidified. The molten resin permeates into spaces among the cement particles and is integrally solidified, and a resin concrete product molded into a predetermined shape is obtained.

Since water and resin are uniformly mixed with cement in substantially dried states when mixing, melted water and resin act on cement, in uniform states as a whole, and a resin concrete after being solidified also shows a uniform property. Furthermore, since water is mixed with cement particles in the uniform state, the hydrating reaction of the water and cement is also uniformly performed in the preferable state. Therefore, the water-cement ratio can be as near as possible to the amount of theoretical hydrization.

If desired, a metallic powder such as iron powder, lead powder, etc. may be mixed therein as aggregate when mixing in order to give a solidified resin concrete a shielding performance of radiation. Furthermore, if desired, a high efficiency fiber such as carbon fiber, aramide fiber, etc. may be mixed therein.

Furthermore, in the above embodiment, the water is applied to and mixed with the cement in the form of ice. However, the water may be mixed therein in any state as long as it maintains a substantially solidified-state when mixing. For example, water (or water added with a hardening agent of a two-component mixture of a main component such as polymer, etc., and a hardening agent) may be capsulated in a micro-capsule for use. Otherwise, water and a hardening agent may be separately capsulated. In this case, the atmosphere of the mixing is not necessarily of a temperature below the freezing point as a solidifying point of water as long as it is low enough so as not to melt the resin. The micro-capsule is preferably breakable under pressure. If so, the work can be performed smoothly since the capsule is easily broken by extrusion pressure in extruding.

As a heating method, besides the heating using the heat generated when the extrusion is performed, other suitable heating means may of course be employed for forced heating. The timing for heating is not limited to when the extrusion is performed. Such heating may of course be performed when the mixing is performed, particularly from the latter half of the mixing, irrespective of whether it is a natural heating or forced heating.

One example of the composition (weight part) of a resin concrete is as follow.

Cement: 100 parts
Water (Ice): 15 to 30 parts
Polymer (Resin): 10 to 30 parts (variable at option)
Hardening agent: suitable quantity (solution frozen together with the water is added)
Sand: 20 to 50 parts In the above-described embodiment, the present invention was applied to an extruder. However, the present invention is not limited to the extruder. Alternatively, it may of course be applied to any type of molding using a form.

More specifically, when the mixing of cement, aggregate, water and resin in particle states was finished, the mixture is put into a form and heated as it is. Then, the water and resin are liquefied. The melted water hydrates cement particles nearby and the cement starts being solidified, while the resin permeates into spaces among the cement particles which have started being solidified, and the resin is integrally solidified.

Next, there will be described one example of capsulation of water and resin into a micro-capsule.

It is a usual practice that cement, aggregate, water and resin are put into a mixer when a resin concrete is produced. At this time, the water and resin respectively are capsulated in a micro-capsule. That is, although the water and resin are held in the liquid states, they act as dried particle bodies when mixing, since they are capsulated in a micro-capsule respectively. Therefore, the mixing work can be performed smoothly since the resin will not attach to the mixer. In addition, the micro-capsule particles of the water and resin are uniformly mixed with cement. In this way, when the mixing of the cement, aggregate, water and resin in the dried states is finished, the mixture is put into a form and heated and/or pressurized in that state. Then, the film of the micro-capsule covering the water and resin is broken due to heat and/or pressure, and the water and resin capsulated therein flow out. The water hydrates cement particles nearby and the cement starts being solidified, while the resin permeates into the spaces among the cement particles which have started being solidified, and the resin is integrally solidified.

Since the water and resin capsulated in a micro-capsule are uniformly mixed with the cement in the dried states, the water and resin flowed out uniformly act on the cement as a whole, and the resin concrete after being solidified shows a uniform property.

Also regarding the water and resin capsulated in a micro-capsule, they may be used in the form that, for example, the resin 2 and water 3 are capsulated together in a micro-capsule a as shown in FIG. 1, instead of the water and resin being separately capsulated in micro-capsules as described in the above embodiment.

Furthermore, in the above embodiment, cement, resin water and aggregate are used as material for adding when mixing. It is noted, however, that cement, resin and water are essential, but aggregate is optional. In other words, the aggregate can be omitted, if desired.

Although the present invention has been described with reference to the preferred embodiments, the embodiments described herein are for illustrative purposes only and not in limitation thereof. Also, the scope of the present invention is defined in the appended claims and will not be limited by the description of the embodiments. Accordingly, it will be understood that changes and modifications can be made within the true spirit and scope of the present invention.

What is claimed is:

1. A process of producing a resin concrete comprising the steps of:
   mixing a solidified particulated resin, a substantially solidified-state-maintained water and cement; and
   liquefying said resin and water in said mixture and hydrating said cement with the liquefied water.

2. A process of producing a resin concrete as claimed in claim 1, wherein said substantially solidified-state-maintained water is a particle-state ice.

3. A process of producing a resin concrete as claimed in claim 1, wherein said substantially solidified-state-maintained water is water capsulated in a micro-capsule.

4. A process of producing a resin concrete as claimed in claim 1, wherein said solidified particulated resin is resin capsulated in a micro-capsule.

5. A process of producing a resin concrete as claimed in claim 1, wherein said solidified particulated resin and substantially solidified-state-maintained water are resin and water capsulated together in a micro-capsule.

6. A process of producing a resin concrete as claimed in claim 1, wherein said mixing is performed after adding aggregate to said cement, resin and water.

7. A process of producing a resin concrete as claimed in claim 6, wherein said aggregate, which is added when mixing, is mixed with a high efficiency fiber.

8. A process of producing a resin concrete as claimed in claim 6, wherein said aggregate, which is added when mixing, is mixed with a metallic powder.

9. A process of producing a resin concrete as claimed in claim 1, wherein said resin is a two-component resin composed of a polymer as a main component and a hardening agent.

10. A process of producing a resin concrete as claimed in claim 9, wherein said substantially solidified-state-maintained water is an aqueous solution including a mixture of said hardening agent and water.

11. A process of producing a resin concrete as claimed in claim 9, wherein said hardening agent and substantially solidified-state-maintained water are mixed while maintaining a substantially solidified state respectively.

12. A process of producing a resin concrete comprising the steps of:
    mixing a solidified particulated resin, a substantially solidified-state-maintained water and cement; and
    extruding the resultant mixture of said cement, resin and water.

13. A process of producing a resin concrete as claimed in claim 12, wherein said resin is a two-component resin composed of a polymer as a main component and a hardening agent.

14. A process of producing a resin concrete as claimed in claim 13, wherein said substantially solidified-state-maintained water is an aqueous solution including a mixture of said hardening agent and water.

15. A process of producing a resin concrete as claimed in claim 13, wherein said hardening agent and substantially solidified-state-maintained water are mixed while maintaining a substantially solidified state respectively.

16. A process of producing a resin concrete comprising the steps of:
    mixing resin, solidified and particulated at a temperature below the solidifying point thereof, a substantially solidified-state-maintained water and cement, to obtain a particulated mixture of said cement, resin and water;
    putting said particulated mixture into a form;
    heating said mixture; and
    melting said resin by said heat, thereby to allow said resin to flow into said mixture, liquefying said water, and hydrating said cement with said liquefied water.

17. A process of producing a resin concrete comprising the steps of:
    mixing resin, capsulated in a micro-capsule, a substantially solidified-state-maintained water and cement, to obtain a particulated mixture of said cement, capsulated resin and water;
    putting said particulated mixture into a form; and
    breaking said micro-capsule, thereby to allow said resin to flow into said mixture, liquefying said water, and hydrating said cement with said liquefied water.

* * * * *